United States Patent
Hayakawa et al.

(10) Patent No.: US 7,733,601 B2
(45) Date of Patent: Jun. 8, 2010

(54) HARD DISK DRIVE ADAPTED TO PREVENT RELEASE OF STRAIN BETWEEN VOICE COIL MOTOR AND BASE

(75) Inventors: Satoshi Hayakawa, Kanagawa (JP); Eiji Soga, Kanagawa (JP); Kohichi Takeuchi, Kanagawa (JP); Takashi Kumazawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1030 days.

(21) Appl. No.: 11/350,468

(22) Filed: Feb. 8, 2006

(65) Prior Publication Data

US 2006/0176609 A1    Aug. 10, 2006

(30) Foreign Application Priority Data

Feb. 10, 2005   (JP) .............................. 2005-034654

(51) Int. Cl.
   *G11B 33/14*   (2006.01)
   *G11B 21/08*   (2006.01)
   *G11B 25/04*   (2006.01)
   *G11B 5/55*    (2006.01)

(52) U.S. Cl. .................. 360/97.02; 360/264.7

(58) Field of Classification Search .............. 360/97.01, 360/97.02, 97.03, 98.01, 264.7, 264.8
See application file for complete search history.

(56) References Cited

U.S. PATENT DOCUMENTS

| | | | | |
|---|---|---|---|---|
| 4,639,863 A * | 1/1987 | Harrison et al. | .......... | 360/97.01 |
| 5,313,124 A * | 5/1994 | Macpherson | ............. | 360/264.8 |
| 5,862,020 A * | 1/1999 | Lee | .......... | 360/264.7 |
| 6,429,999 B1 * | 8/2002 | Dague et al. | ............. | 360/97.01 |
| 2002/0047339 A1 * | 4/2002 | Bernett et al. | ................ | 310/51 |
| 2004/0105190 A1 * | 6/2004 | Kim et al. | ................ | 360/264.7 |

FOREIGN PATENT DOCUMENTS

JP     01-171169 A     7/1989

* cited by examiner

*Primary Examiner*—Craig A. Renner
(74) *Attorney, Agent, or Firm*—Townsend and Townsend and Crew LLP; John Henkhaus

(57) ABSTRACT

Embodiments of the invention provide a hard disk drive base adapted to prevent release of a strain due to the difference in thermal expansion between the vice coil motor and the base and thereby prevent a degradation in the positioning accuracy of the magnetic head. In one embodiment, a hard disk drive base is provided which includes a plurality of contact surfaces to which a lower yoke of a voice coil motor is fixed and thin portions each formed around a respective one of the plurality of contact surfaces and having a thickness smaller than that of other portions of the base.

11 Claims, 6 Drawing Sheets

HARD DISK DRIVE ADAPTED TO PREVENT RELEASE OF STRAIN BETWEEN VOICE COIL MOTOR AND BASE

CROSS-REFERENCES TO RELATED APPLICATIONS

This application claims priority from Japanese Patent Application No. JP2005-034654, filed Feb. 10, 2005, the entire disclosure of which is incorporated herein by reference.

BACKGROUND OF THE INVENTION

The present invention relates to a hard disk drive, and more particularly to the structure of a hard disk drive base in which a voice coil motor is mounted.

A hard disk drive typically includes an actuator (which is a collection of a carriage, a voice coil motor, a suspension, a magnetic head, and a bearing), a magnetic disk, a spindle motor, a base, etc. The voice coil motor horizontally rotates the actuator around the bearing shaft and is fixed to the base.

FIG. 5 is a perspective view of the voice coil motor mounting portion of a conventional hard disk drive base. As shown in the figure, the conventional base 11 has a positioning hole 22, a first contact surface 24, a through hole 26 for receiving a clamping screw therethrough, a second contact surface 28, and a screw hole 30. The above contact surfaces are the upper surfaces of the base which are in contact with the voice coil motor. The first contact surface is formed around the positioning hole 22; the second contact surface is formed around the clamping-screw-receiving through hole 26. The actuator is horizontally rotated around a pivot hole 32 shown in FIG. 5.

FIG. 6 is a cross-sectional view showing a conventional base with a voice coil motor mounted therein. As shown in the figure, the lower yoke 40 of the voice coil motor is attached to the base 11 with a screw in such a way that the projection 42 of the lower yoke 40 is engaged with (or inserted into) the positioning hole 22 and the screw is screwed into a screw hole 44 of the lower yoke 40 through the clamping-screw-receiving through hole 26. Thus, the lower yoke 40 is fixed to the base such that it is in contact with the first contact surface 24 and the second contact surface 28 of the base. There is a slight clearance between the lower yoke 40 and other upper surfaces of the base 11; the lower yoke 40 is not in contact with these other upper surfaces. Further, the upper yoke 50 of the voice coil motor is attached to the base 11 with a screw screwed into the screw hole 30.

The components of a hard disk drive are made of different materials; for example, the voice coil motor is made primarily of steel and the base is formed primarily of aluminum. This means that these components generally have different coefficients of thermal expansion. This may result in a degradation in the positioning accuracy of the magnetic head due to a variation in the temperature within the hard disk drive. In some conventional hard disk drives, a spring washer is inserted between the head clamp and the magnetic head to prevent the degradation in the positioning accuracy of the magnetic head due to thermal expansion, as described in Patent Document 1 (Japanese Laid-Open No. Hei 1-171169).

BRIEF SUMMARY OF THE INVENTION

The contact surfaces between the voice coil motor and the base configured as described above receives a shearing force due to the difference between the coefficients of thermal expansion of the voice coil motor and the base. When the shearing force trying to displace the voice coil motor from the base exceeds the frictional force on the contact surfaces between them, the strain is instantaneously released, which may result in an off-track write operation. An off-track write operation is a phenomenon in which, for example, a magnetic head currently writing to track 1 erroneously moves to an adjacent track (or track 2) due to an unwanted force, etc., as shown in FIG. 7. In recent years, this problem has become increasingly serious as the recording density of the magnetic disk has increased and hence the track width (the width of each concentric recording region on the magnetic disk) has decreased.

The present invention has been devised in view of the above problems. It is, therefore, a feature of the present invention to provide a hard disk drive base adapted to prevent release of a strain due to the difference in thermal expansion between the voice coil motor and the base and thereby prevent a degradation in the positioning accuracy of the magnetic head.

To solve the above problems, the present invention provides a hard disk drive base including: a plurality of contact surfaces to which a lower yoke of a voice coil motor is fixed; and thin portions each formed around a respective one of the plurality of contact surfaces and having a thickness smaller than that of other portions of the base.

According to the present invention, the in-plane stiffness of the base can be reduced to reduce the shearing force applied to the plurality of contact surfaces between the voice coil motor and the base due to temperature change and thereby prevent release of the strain between the voice coil motor and the base.

According to another aspect of the present invention, the plurality of contact surfaces include: a first contact surface formed around a positioning hole such that it protrudes a predetermined height, the first contact surface being in contact with the lower yoke, the positioning hole being engaged with a projection of the lower yoke; and a second contact surface formed around a through hole such that it protrudes a predetermined height, the second contact surface being in contact with the lower yoke, the through hole receiving a clamping screw therethrough with which the lower yoke is fixed to the base.

This arrangement can reduce the in-plane stiffness of the portions surrounding the first contact surface around the positioning hole and surrounding the second contact surface around the clamping-screw-receiving through hole, thereby reducing the shearing force applied to the first and second contact surfaces.

According to still another aspect of the present invention, the thin portions include: a first thin portion formed around the first contact surface such that it has a ring shape concentric with the positioning hole, the first thin portion having a thickness smaller than that of the above other portions of the base; and a second thin portion formed around the second contact surface such that it has a ring shape concentric with the through hole, the second thin portion having a thickness smaller than that of the above other portions of the base.

This arrangement can effectively reduce the in-plane stiffness of the portions surrounding the first and second contact surfaces, thereby effectively reducing the shearing force applied to these contact surfaces.

According to yet another aspect of the present invention, the first and second thin portions each have a ring shape with one or more separations in its circumference; that is, they have a partial ring shape.

This arrangement can effectively reduce the in-plane stiffness of the portions surrounding the first and second contact surfaces and thereby effectively reduce the shearing force applied to these contact surfaces while maintaining the stiffness in directions perpendicular to the base surface by reducing the areas of the thin portions.

According to still a further aspect of the present invention, the thin portions each encircle a respective one of the plurality of contact surfaces and have a thickness smaller than that of the above other portions of the base.

This arrangement can reduce the in-plane stiffness of the portions surrounding the plurality of contact surfaces, thereby reducing the shearing force applied to these contact surfaces.

According to yet another aspect of the present invention, the thin portions each have a thickness about one quarter or more of the thickness of the above other portions of the base.

This arrangement can reduce the stiffness in directions parallel to the base surface and thereby reduce the shearing force applied to the contact surfaces to prevent release of the strain between the voice coil motor and the base while maintaining the required level of stiffness in directions perpendicular to the base surface.

DETAILED DESCRIPTION OF THE INVENTION

An exemplary embodiment of the present invention will be described below in detail with reference to the accompanying drawings.

Figure 1:
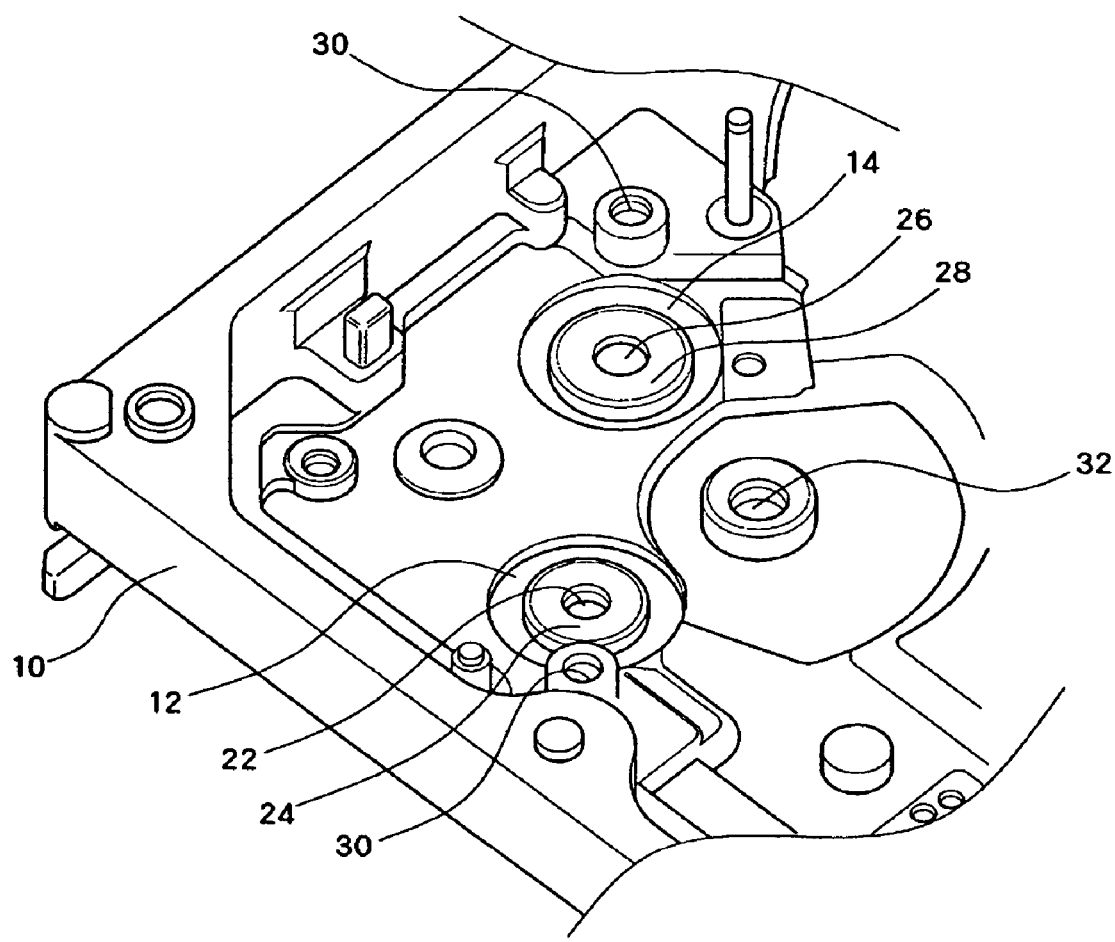
FIG. 1 is a perspective view of a base according to an embodiment of the present invention.
Figure 5:
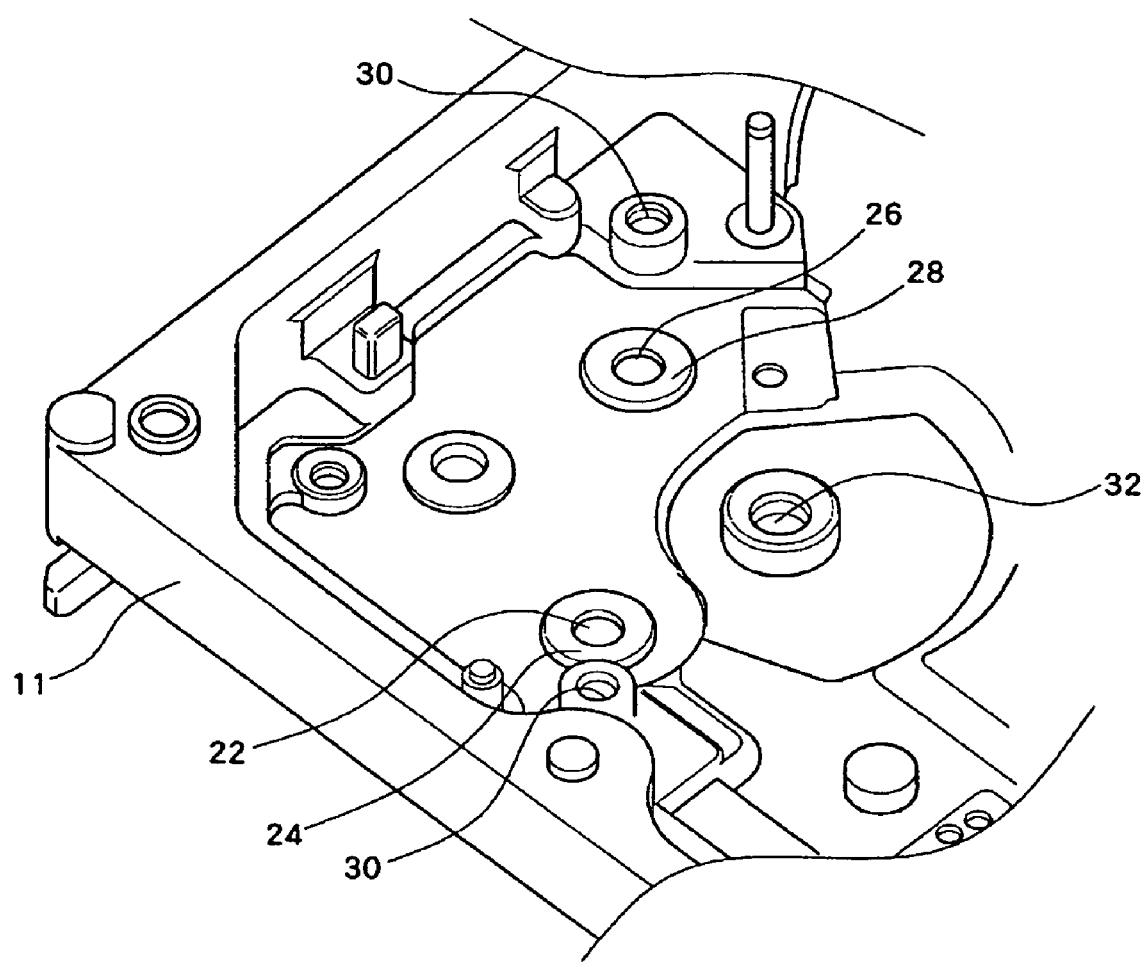
FIG. 5 is a perspective view of a conventional hard disk drive.

FIG. 1 is a perspective view of a base 10 according to an embodiment of the present invention. As shown in the figure, the base 10 differs from the conventional base shown in FIG. 5 in that a first thin portion 12 is provided around the first contact surface 24 and a second thin portion 14 is provided around the second contact surface 28. The actuator is horizontally rotated around the pivot hole 32 shown in FIG. 1.

According to the present embodiment, the first thin portion 12 is formed by cutting off an annular portion of the base surface concentric with the positioning hole 22. However, it may be formed by die casting. The outside diameter of the first thin portion must be set as large as possible as long as it does not interfere with the base structure surrounding the first contact surface. The inside diameter of the first thin portion must be slightly larger than the diameter of the first contact surface.

According to the present embodiment, the second thin portion 14 is formed by cutting off an annular portion of the base surface concentric with the clamping-screw-receiving through hole 26. However, it may be formed by die casting. The outside diameter of the second thin portion must be set as large as possible as long as it does not interface with the base structure surrounding the second contact surface, and the inside diameter must be slightly larger than the diameter of the second contact surface, as in the case of the first thin portion.

Figure 2:
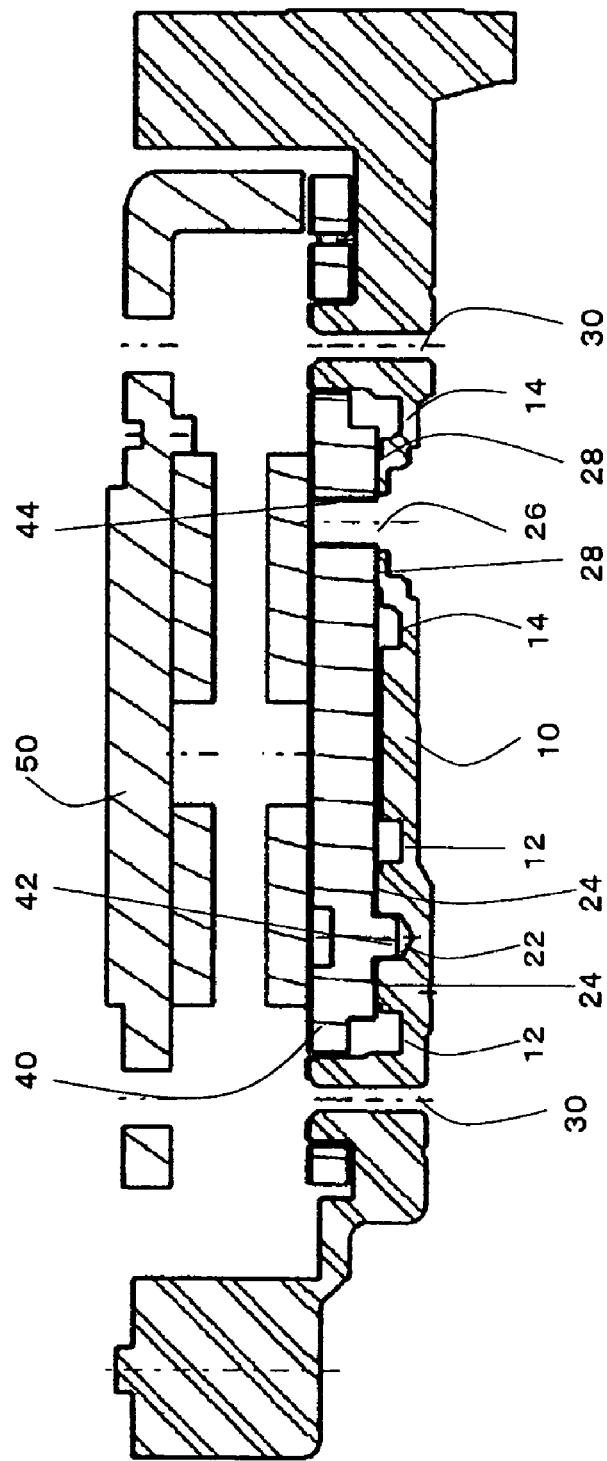
FIG. 2 is a cross-sectional view showing the base of the embodiment with a voice coil motor mounted therein.
Figure 6:
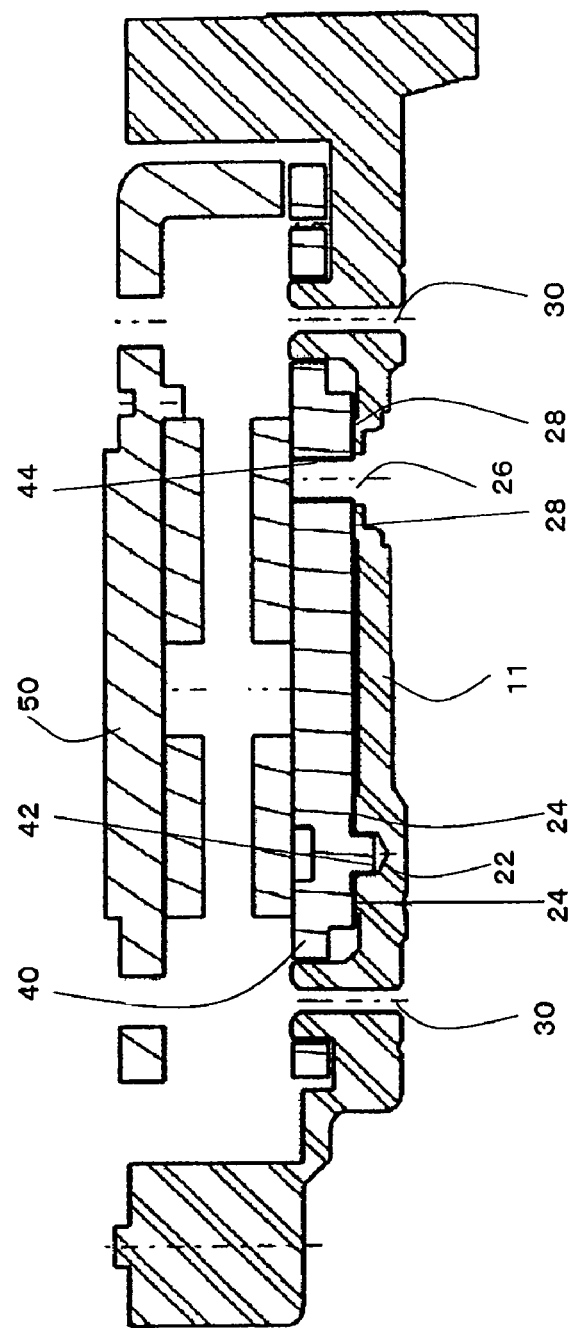
FIG. 6 is a cross-sectional view showing a conventional base with a voice coil motor mounted therein.
Figure 7:
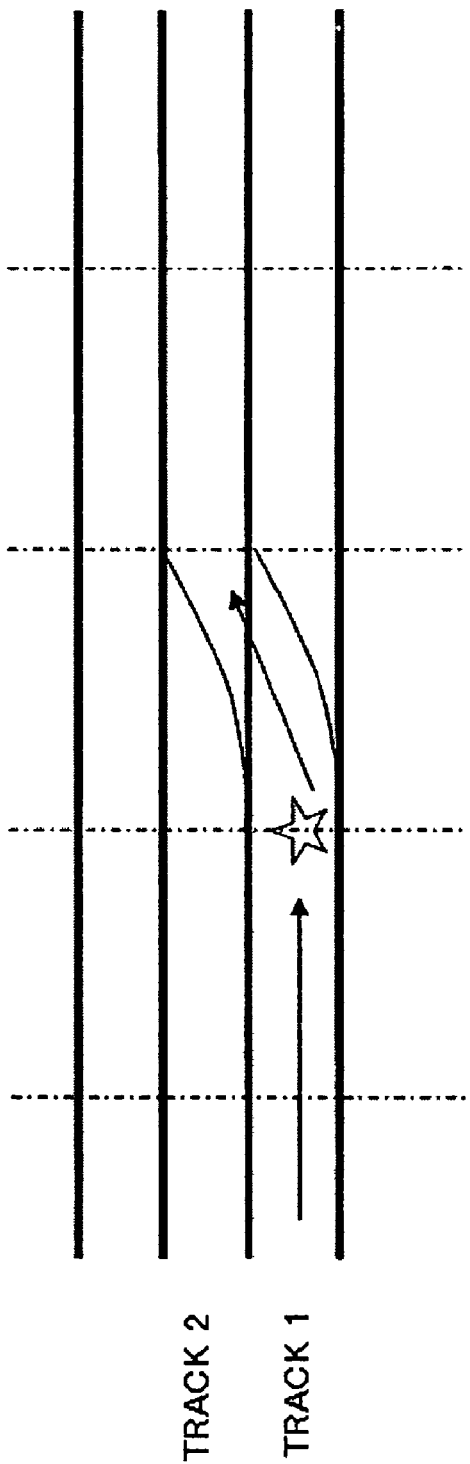
FIG. 7 is a diagram showing an off-track write operation.

FIG. 2 is a cross-section view showing the base 10 of the present embodiment with a voice coil motor mounted therein. As with the conventional base shown in FIG. 6, the lower yoke 40 of the voice coil motor is attached to the base 10 with a screw in such a way that the projection 42 of the lower yoke 40 is engaged with (or inserted into) the positioning hole 22 and the screw is screwed into the screw hole 44 of the lower yoke 40 through the clamping-screw-receiving through hole 26. Thus, the lower yoke 40 is fixed to the base 10 such that it is in contact with the first contact surface 24 and the second contact surface 28 of the base 10.

The first thin portion 12 provided around the first contact surface 24 has a thickness approximately one half of the base thickness. It should be noted that the base thickness above is the thickness of the base before the first and second thin portions are formed by cutting annular portions from its surface. Further, the second thin portion 14 provided around the second contact surface 28 has a thickness approximately one half of the base thickness, as with the first thin portion 12.

The above configuration is designed to prevent off-track write operation due to the difference between the coefficients of thermal expansion of the base and the voice coil motor. Such an off-track write operation can be prevented by reducing the shearing force applied to the contact surfaces of the base. The in-plane stiffness of the portions surrounding the contact surfaces of the base may be reduced to reduce the shearing force applied to the contact surfaces. According to the present invention, the first thin portion 12 and the second thin portion 14 are formed in the base 10 so as to reduce the in-plane stiffness of the portions surrounding the first contact surface 24 and the second contact surface 28 of the base 10 and thereby reduce the above shearing force. It is necessary that the stiffness in directions parallel to the surface of the base 10 be reduced while avoiding as much as possible reduction in the stiffness in directions perpendicular to the surface of the base 10. To achieve this, the thin portions 12, 14 are preferably wide and not too thin.

A description will be given below of the effects of the base 10 of the present embodiment.

The following experiment was conducted to compare the base of the present embodiment and a conventional base in terms of performance. In the experiment, three samples of the base 10 of the present embodiment and three samples of a conventional base were prepared. A voice coil motor is mounted in each base sample, and they are subjected to three heat cycles with the maximum and minimum temperatures set at 100° C. and −20° C. We counted the number of shocks detected in each base 10 sample and each conventional base sample.

Figure 3:
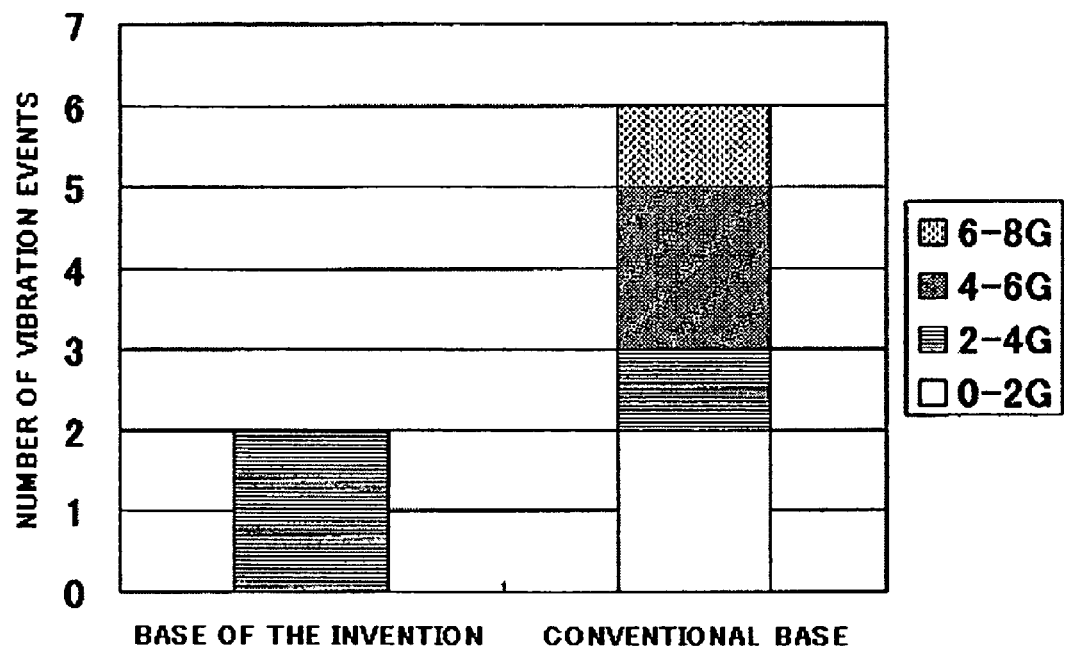
FIG. 3 is a diagram showing experimental results to compare the base of the embodiment and a conventional base in terms of performance.

FIG. 3 collectively shows the experimental results. In the figure, the results on the base 10 sample group of the present embodiment are shown on the left and those on the conventional base sample group are on the right. The vertical axis represents the number of vibration events that occurred due to shock. The detected vibrations were classified into four classes by magnitude: 0-2 G vibration, 2-4 G vibration, 4-6 G vibration, and 6-8 G vibration (where G denotes the gravitational acceleration). The number of vibration events detected was counted for each class.

In the case of the conventional base sample group, we detected two 0-2 G vibration events, one 2-4 G vibration event, two 4-6 G vibration events, and one 6-8 G vibration event. In the case of the base sample group according to the present invention, on the other hand, we detected only two 4-6

G vibration events. That is, the above experimental results show quantitatively that the configuration of the base of the present invention allows it to reduce the number of strain release events due to the difference in thermal expansion between the voice coil motor and the base.

As described above, the base 10 of the present embodiment can prevent release of a strain due to the difference in thermal expansion between the voice coil motor and the base and thereby prevent a degradation in the positioning accuracy of the magnetic head.

It should be noted that the present invention is not limited to the above embodiment.

Figure 4:
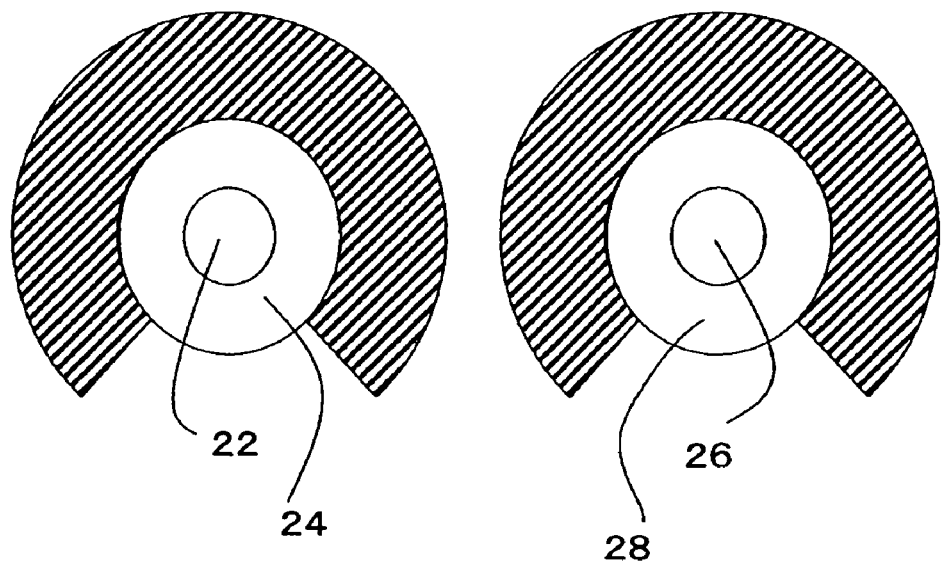
FIG. 4 is a plan view of a base, showing exemplary positions of first and second thin portions.

For example, even though the present embodiment entirely encircles the first and second contact surfaces with the first and second thin portions, respectively, these contact surfaces may be partially encircled by these thin portions. FIG. 4 shows such an arrangement. In the figure, the first and second thin portions each have a ring shape with a separation in its circumference, that is, they have a partial ring shape. The figure is a partial plan view of the base, showing only the first and second contact surfaces and their vicinities. The first and second thin portions are shaded in the figure. Further, even though the first and second thin portions shown in FIG. 4 each have a ring shape with a single separation in its circumference, they may be formed in a ring shape with two or more separations in its circumference.

Further, even though the present embodiment forms thin portions having a circular ring shape around the first and second contact surfaces, thin portions having a polygonal ring shape may be formed instead.

Further, even though the present embodiment reduces the in-plane stiffness of the base by forming thin portions around the contact surfaces, through-holes may be formed in the base instead to achieve such a reduction.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A hard disk drive base comprising:
a plurality of contact surfaces to which a lower yoke of a voice coil motor is to be fixed; and
thin portions each formed around a respective one of said plurality of contact surfaces and having a thickness smaller than a thickness of other portions of said base,
wherein said plurality of contact surfaces include:
a first contact surface formed around a positioning hole such that the first contact surface protrudes a first predetermined height, said first contact surface being in contact with said lower yoke, said positioning hole being engaged with a projection of said lower yoke; and
a second contact surface formed around a through hole such that the second contact surface protrudes a second predetermined height, said second contact surface being in contact with said lower yoke, said through hole receiving a clamping screw therethrough with which said lower yoke is fixed to said base, wherein said thin portions include:
a first thin portion formed around said first contact surface such that the first thin portion has a ring shape concentric with said positioning hole, said first thin portion having a thickness smaller than the thickness of said other portions of said base; and
a second thin portion formed around said second contact surface such that the second thin portion has a ring shape concentric with said through hole, said second thin portion having a thickness smaller than the thickness of said other portions of said base.

2. The hard disk drive base as claimed in claim 1, wherein said first and second thin portions each have a ring shape with one or more separations in a circumference thereof to form a partial ring shape.

3. The hard disk drive base as claimed in claim 2, wherein said thin portions each partially encircle a respective one of said plurality of contact surfaces and have a thickness smaller than the thickness of said other portions of said base.

4. The hard disk drive base as claimed in claim 3, wherein said thin portions each have a thickness about one quarter or more of the thickness of said other portions of said base.

5. The hard disk drive base as claimed in claim 4, wherein said thin portions each have a thickness equal to about one half of the thickness of other portions of said base.

6. The hard disk drive base as claimed in claim 2, wherein said thin portions each have a thickness about one quarter or more of the thickness of said other portions of said base.

7. The hard disk drive base as claimed in claim 1, wherein said thin portions each encircle a respective one of said plurality of contact surfaces and have a thickness smaller than the thickness of said other portions of said base.

8. The hard disk drive base as claimed in claim 7, wherein said thin portions each have a thickness about one quarter or more of the thickness of said other portions of said base.

9. The hard disk drive base as claimed in claim 1, wherein said thin portions each have a thickness about one quarter or more of the thickness of said other portions of said base.

10. The hard disk drive base as claimed in claim 1, wherein said thin portions have a surface that is recessed relative to an adjacent top surface of the base.

11. A hard disk drive comprising:
a voice coil motor having a lower yoke; and
a base comprising,
plurality of contact surfaces to which a lower yoke of a voice coil motor is to be fixed; and
thin portions each formed around a respective one of said plurality of contact surfaces and having a thickness smaller than a thickness of other portions of said base, wherein said plurality of contact surfaces include,
a first contact surface formed around a positioning hole such that the first contact surface protrudes a first predetermined height, said first contact surface being in contact with said lower yoke, said positioning hole being engaged with a projection of said lower yoke; and
a second contact surface formed around a through hole such that the second contact surface protrudes a second predetermined height, said second contact surface being in contact with said lower yoke, said through hole receiving a clamping screw therethrough with which said lower yoke is fixed to said base, and
wherein said thin portions include,
a first thin portion formed around said first contact surface such that the first thin portion has a ring shape concentric with said positioning hole, said first thin portion having a thickness smaller than the thickness of said other portions of said base; and
a second thin portion formed around said second contact surface such that the second thin portion has a ring shape concentric with said through hole, said second thin portion having a thickness smaller than the thickness of said other portions of said base.

* * * * *